United States Patent [19]
Asumendi

[11] 3,830,047
[45] Aug. 20, 1974

[54] RATOONING DEVICE

[76] Inventor: Vicente Asumendi, P.O. Box 620, Ayr, Jarvisfield, North Queensland, Australia

[22] Filed: Nov. 15, 1972

[21] Appl. No.: 306,588

[30] Foreign Application Priority Data
Nov. 13, 1972  Australia............................ 7158/72

[52] U.S. Cl...................... 56/53, 56/13.6, 172/749, 56/6
[51] Int. Cl............................................. A01d 45/02
[58] Field of Search............. 56/13.6, 6, 51, 52, 53, 56/54–60, 61–66, 102, 14.7; 172/48–60, 349, 749, 750, 751

[56] References Cited
UNITED STATES PATENTS

| | | | |
|---|---|---|---|
| 974,358 | 11/1910 | Clark | 56/102 |
| 975,109 | 11/1910 | Baldwin | 172/349 |
| 1,539,346 | 5/1925 | Bird | 56/102 |
| 2,036,111 | 3/1936 | Wilson | 172/749 |
| 2,649,722 | 8/1953 | Raught | 172/734 X |
| 2,720,740 | 10/1955 | Price | 56/13.6 |

*Primary Examiner*—Russell R. Kinsey
*Attorney, Agent, or Firm*—Eric H. Waters

[57] ABSTRACT

A ratooning implement comprising a tool bar adapted for mounting on a tractor hitch on which there is mounted at least one pair of cutters having overlapping rotary circular cutting discs.

4 Claims, 6 Drawing Figures

PATENTED AUG 20 1974 3,830,047

SHEET 2 OF 3

RATOONING DEVICE

This invention relates to means for ratooning, that is, levelling old growth above the ground remaining after harvest of root crops, e.g., sugar cane, so that young growth or ratoons can shoot from the ground roots.

This invention provides a ratooning implement comprising a tool bar adapted to be mounted on the three point linkage of a tractor, at least one pair of cutting discs units each having a cutting disc, the cutting discs of each unit being in rubbing overlapping relationship, said units being mounted movably on the tool bar, the discs lying in planes which when the tool bar is mounted on the tractor and lowered to operative position are substantially parallel to the surface of the soil over which the implement is to pass.

Figure 1:
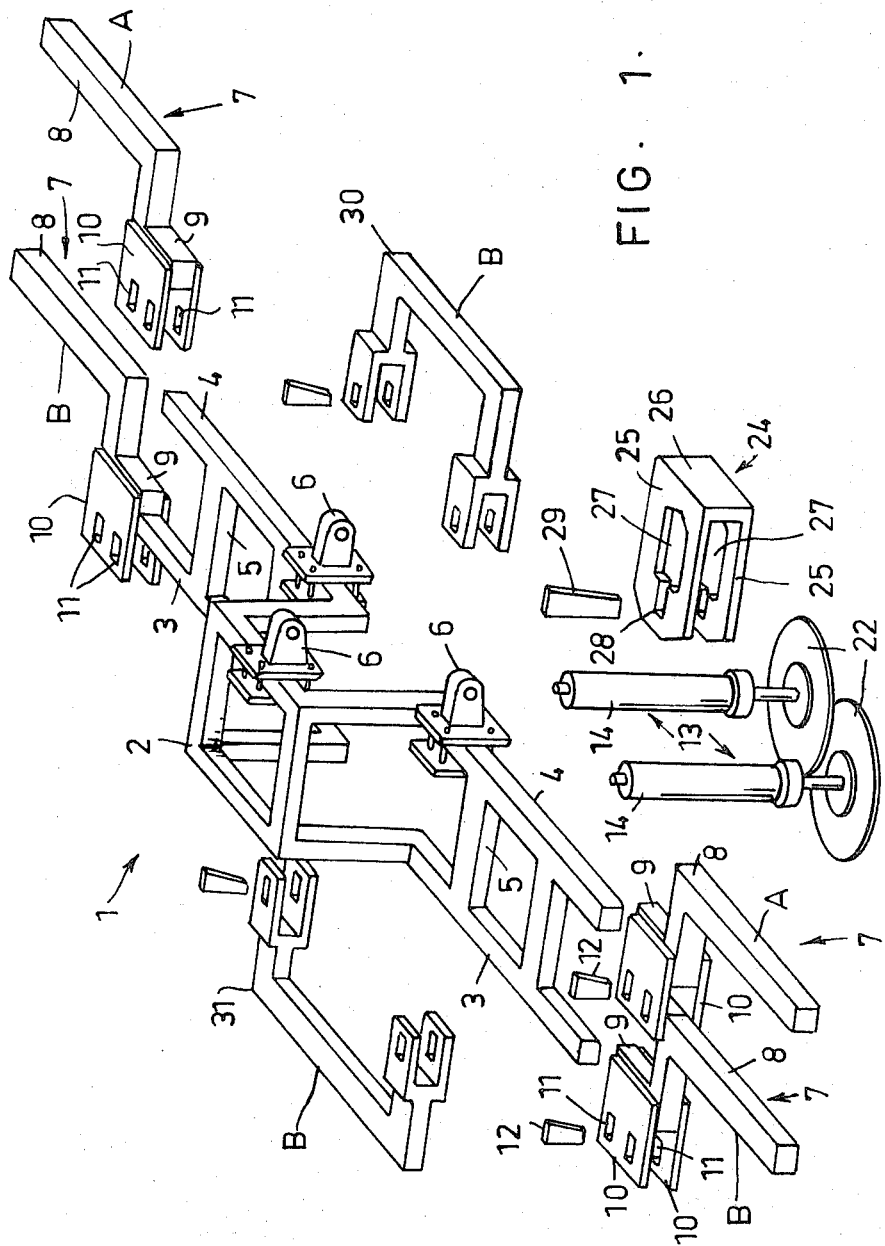
Figure 2:
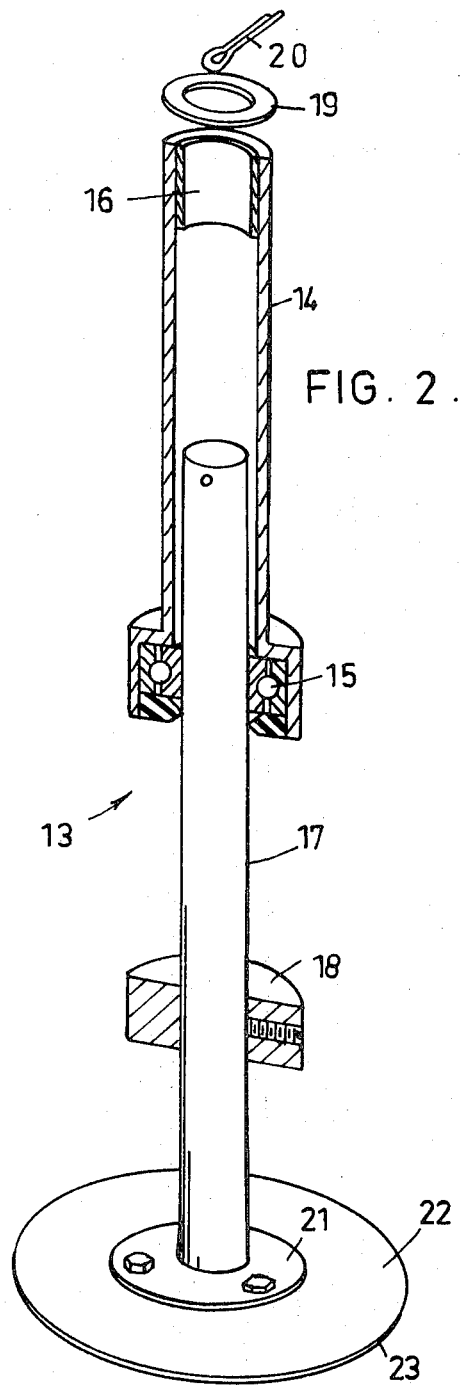

The invention in a presently preferred form is described with reference to the accompanying drawings in which FIG. 1 is a perspective exploded view of a tool bar showing extensions therefore and means for attaching the extensions and a pair of ratooning disc units FIG. 2 is a perspective partly sectioned view to enlarged scale of a ratooning disc unit illustrated in FIG. 1

Figure 3:
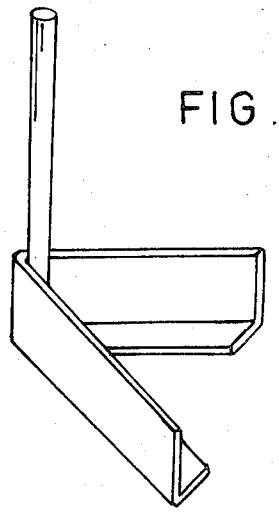
Figure 4:
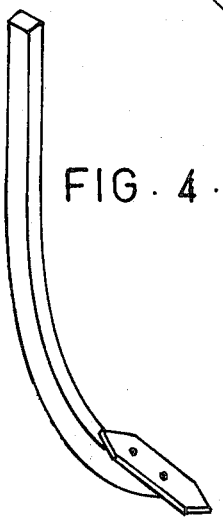
Figure 5:
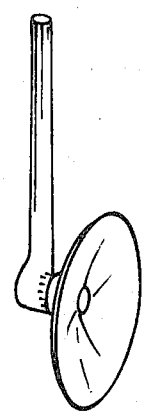
Figure 6:
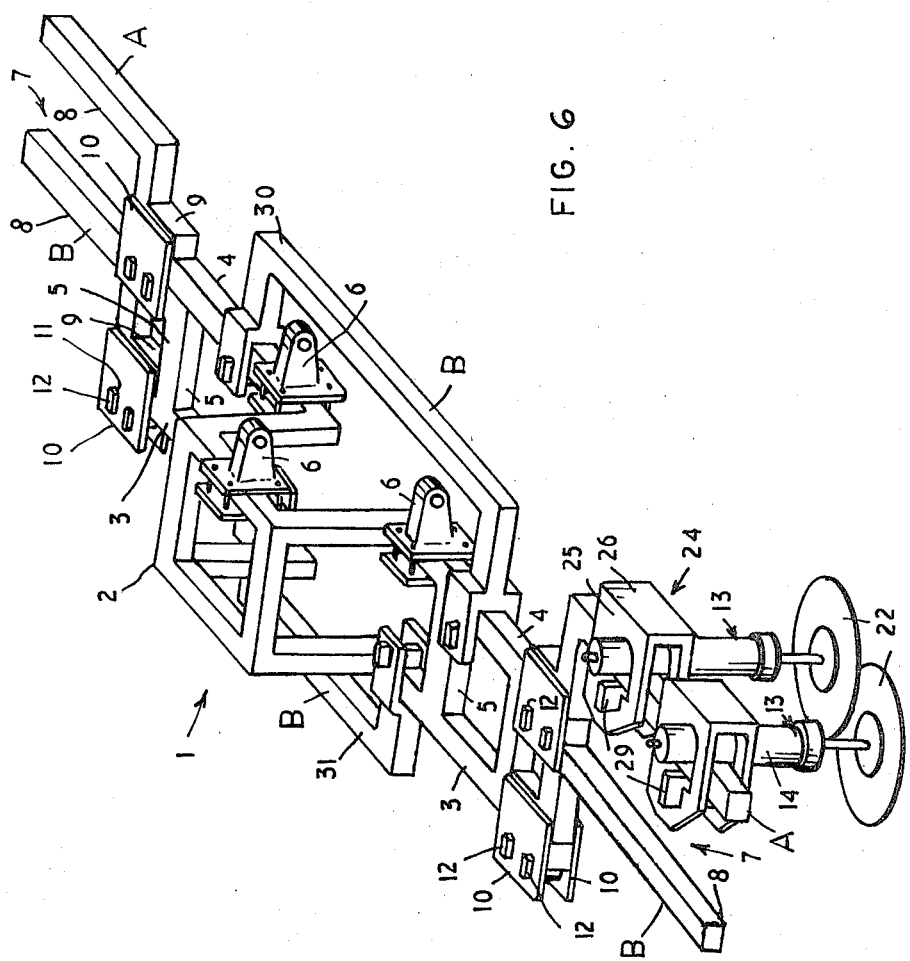

FIG. 3 is a perspective view of an earth spreader or trench former mountable on the tool bar FIG. 4 is a perspective view of an earth breaking unit mountable on the tool bar FIG. 5 is a perspective view of a ploughing disc unit mountable on the tool bar, and FIG. 6 is a perspective view of a tool bar and ratooning disc unit assembly.

Referring to FIGS. 1 and 6 the tool bar 1 will be seen to comprise a main part having a central arch 2 with outwardly extending legs 3 and 4. The legs 3 and 4 to each side of the arch are joined by ties 5. Hitch bearings 6 are removably mounted by bolts and clamp plates on the legs 4 and the arch 2 to enable the three point hitch links of a tractor to be coupled to the tool bar. In this way the tool bar can be raised and lowered in known manner between its travelling and working positions.

Implements of a variety of forms may be mounted on the main tool bar part or on extensions 7 adapted to be mounted on the tool bar part. Each extension 7 comprises a Z shaped member made of a square cross-section steel bar having a main leg 8 and a mounting leg 9 to which is fixed two mounting plates 10. The plates 10 are spaced apart sufficiently to receive a tool bar main part leg 4 or 3 as required and each plate 10 has two slots 11 therein. Corresponding slots 11 in the upper and lower plates 10 are adapted to receive a wedge 12 whereby a tool bar main part leg 3 or 4 can be clamped between the extension leg 9, the plates 10 and the wedge 12.

From the drawings it will be seen that the extensions 7 (when fixed to both tool bar main part legs 3 and 4) interleave to provide mutual support, the corner of the extension leg 8 (of the extension fixed to the tool bar main part leg 3) engages in the gap between the plates 10 of the extension fixed to the tool bar main part leg 4.

Auxiliary supports 30 and 31 may be mounted on the tool bar main part as is shown on FIG. 6. It is clear how these supports are mounted from the foregoing description and the drawing.

The disc units 13 intended for ratooning each comprises a housing 14 which is preferably made of tubular steel and has at its lower end a dust sealed ball bearing 15 and at its upper end a dust sealed bushing 16. A shaft 17 is mounted in the ball bearing 15 and bushing 16 and is prevented from moving axially by a collar 18 adjacent the ball bearing 15 and a washer 19 and split pin 20 at the upper end. To the lower projecting end of the shaft is fixed a flange 21 and a cutter disc 22 is removably secured by screws to the disc 22. The disc 22 has an angled peripheral cutting edge 23. Lubrication means may be provided for the bearing and bushing if desired.

The units 13 are each mounted by a U shaped clamp bracket 24 to an extension leg 8 or a tool bar main part leg 3 or 4. The U clamp bracket 24 has two arms 25 joined by a base 26. Each arm 25 has an opening 27 therein to permit the tubular housings 14 to pass through the bracket and there is a wedge receiving slot 28 in each arm 25 intersecting the opening 27.

The extension leg 8 or tool bar main part leg 3 or 4 is disposed between the arms 25 and clamped between the ratooning disc housing 14 and a wedge 29 driven into the slots 28. Prior to this the housing 14 is positioned for height.

In practice the disc units 13 are mounted in pairs with the discs 22 in rubbing and overlapping relationship.

No drive is required to rotate the discs, the engagement of old growth or stubble by the discs in the pinch where the discs overlap, is sufficient to rotate them and cause a cutting action as the tractor moves through the field. The number of pairs of disc units may be varied, as may the lengths of the extensions. Usually three pairs of ratooning disc units are mounted at spacings corresponding to the spacing of the crop rows.

It is obvious from the drawings that combinations of tools may be used with the tool bar. For example, a pair of ratooning discs may be mounted at the points marked A in FIGS. 1 and 6 and a trench former as illustrated in FIG. 3 may be mounted at the points B in FIGS. 1 and 6.

The tool bar is also readily usable for mounting other implements in a manner similar to the disc units 13. Examples of such implements are illustrated in FIGS. 4 and 5.

I claim:

1. A ratooning implement comprising a tool bar adapted to be mounted on the three point linkage of a tractor, at least one pair of cutting disc units each having a movable and rotatable cutting disc, the cutting disc of each unit being positionable in rubbing overlapping relationship, said units being mountable on the tool bar, the discs lying in planes which when the tool bar is mounted on the tractor and lowered to operative position would be substantially parallel to the surface of the soil over which the implement is intended to pass, said tool bar comprising a main section adapted to be fastened to said three point linkage, extensions projecting from said main action, said extensions being clampable on the main section with adjacent extensions interleaving to mutually support each other, said first-mentioned extensions each including a Z shaped bar of uniform rectangular cross-sectional shape secured to said main section, a pair of plates at one extremity of each said extension, said plates being spaced apart to engage parts of the main frame and receive a portion of an adjacent one of said Z shaped bar, each pair of plates having openings therein, a wedge being received in each said opening whereby the main frame part on which the Z shaped bar is mounted is clampable between part of said Z shaped bar lying between said plates and said wedge.

2. A ratooning implement as claimed in claim 1 wherein each disc unit comprises an elongated housing having bearings at the lower end and a bushing in the upper end thereof, a shaft extending through the bearings and bushing so as to be rotatably supported in said housing, means on the shaft to prevent axial movement of the shaft in the bearings and bushing, a flange on one end of the shaft and a sharp edged disc demountably secured to the flange.

3. A ratooning implement as claimed in claim 2 wherein each bearing and bushing forms sealing means against the introduction of dust and like into said elongated housing.

4. A ratooning implement as claimed in claim 1 wherein each disc unit is adjustably mounted on the tool bar.

* * * * *